(12) United States Patent
Chow et al.

(10) Patent No.: US 11,059,707 B2
(45) Date of Patent: Jul. 13, 2021

(54) LOAD SUPPORTING APPARATUS FOR AN AUTOMATED GUIDE VEHICLE

(71) Applicant: Logistics and Supply Chain MultiTech R&D Centre Limited, Pok Fu Lam (HK)

(72) Inventors: Wing Leung Chow, Pok Fu Lam (HK); King Sau Wong, Pok Fu Lam (HK); Tsz Hin Wong, Pok Fu LAm (HK); Kwai Yuen Tiu, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 185 days.

(21) Appl. No.: 16/229,019

(22) Filed: Dec. 21, 2018

(65) Prior Publication Data

US 2020/0198946 A1    Jun. 25, 2020

(51) Int. Cl.
*B66F 9/065* (2006.01)
*B66F 9/06* (2006.01)
*B66F 9/075* (2006.01)
*B65G 1/04* (2006.01)
*B66F 9/24* (2006.01)

(52) U.S. Cl.
CPC ............ *B66F 9/063* (2013.01); *B65G 1/0492* (2013.01); *B66F 9/0755* (2013.01); *B66F 9/24* (2013.01)

(58) Field of Classification Search
CPC ........... B66F 9/063; B66F 9/24; B65G 1/0492
See application file for complete search history.

(56) References Cited

U.S. PATENT DOCUMENTS

| 7,850,413 | B2 * | 12/2010 | Fontana | B66F 3/44 |
| | | | | 414/331.14 |
| 10,106,383 | B2 * | 10/2018 | Shen | B66F 3/08 |
| 10,343,881 | B2 * | 7/2019 | Guo | B65G 1/137 |
| 2018/0084756 | A1 * | 3/2018 | Bowser | B66F 7/0625 |
| 2018/0099810 | A1 * | 4/2018 | Wu | B65G 1/0492 |
| 2018/0141752 | A1 * | 5/2018 | Nakanishi | B65G 1/137 |
| 2019/0295591 | A1 * | 9/2019 | Pajevic | G11B 19/2009 |
| 2019/0308856 | A1 * | 10/2019 | Wright | B65G 1/0492 |

\* cited by examiner

*Primary Examiner* — Jonathan Snelting
(74) *Attorney, Agent, or Firm* — Renner, Kenner, Greive, Bobak, Taylor & Weber (57) ABSTRACT

A system and a method for an automated guided vehicle (AGV) includes a chassis; a load supporting apparatus disposed on the chassis, the load supporting apparatus including a platform to support a load, a lifting mechanism comprising one or more jacks, the platform coupled to the one or more jacks, the one or more jacks configured to raise or lower the platform, and a rotation mechanism coupled to the platform, the rotation mechanism configured to rotate the platform, wherein the rotation mechanism is configured to rotate the platform in response to the AGV turning.

25 Claims, 5 Drawing Sheets

LOAD SUPPORTING APPARATUS FOR AN AUTOMATED GUIDE VEHICLE

TECHNICAL FIELD

The present disclosure relates to a load supporting apparatus for an automated guided vehicle (AGV) to support a load or object. The present disclosure also relates to an AGV comprising a load supporting apparatus to stably carry a load.

BACKGROUND

Warehousing is becoming increasingly popular especially with the increasing popularity of online shopping and delivery of goods. Warehouses are an example of an indoor environment where automated guided vehicles are commonly used. An automated guided vehicle (AGV) is a mobile robot or mobile vehicle that is used in a warehouse for various functions such as moving shelving racks or moving goods between shelves or stacking goods etc. AGVs are also used to transport other objects such as boxes or goods around an environment e.g. around a warehouse. AGVs include suspension systems that attempt to adapt to uneven surfaces. Current load supporting structures can experience instability due to movement of the AGV e.g. during acceleration and deceleration or as the AGV turns (i.e. rotates). This can cause the load to move around on the platform or fall from the platform.

SUMMARY OF THE INVENTION

The present disclosure relates to an automated guided vehicle including a load supporting apparatus that provides a stable structure to retain and support a load e.g. an object or box or a shelf or other items. The load supporting apparatus includes a platform for retaining and supporting a load and a stabilisation arrangement that is configured to raise and rotate the platform in order to stabilise the platform and the supported load.

In accordance with a first aspect the present invention relates to an automated guided vehicle comprising:
 a chassis;
 a load supporting apparatus disposed on the chassis, the load supporting apparatus comprising;
 a platform to support a load, a lifting mechanism comprising one or more jacks, the platform coupled to the one or more jacks, the one or more jacks configured to raise or lower the platform, a rotation mechanism coupled to the platform, the rotation mechanism configured to rotate the platform, wherein the rotation mechanism is configured to rotate the platform in response to the AGV turning.

In an embodiment the platform is plate having a multi-sided polygon shape.

In an embodiment the platform comprises an arcuate periphery.

In an embodiment the platform is a circular shape.

In an embodiment the AGV comprises a drive assembly disposed on the chassis, the drive assembly comprises a drive motor configured to generate a propulsion force to propel the AGV and the drive assembly further comprises a turning motor configured generate a turning force to turn the AGV.

In an embodiment the load supporting apparatus comprises three or more mounting struts, the mounting struts configured to mount the load supporting apparatus on the chassis.

In an embodiment the lifting mechanism comprises three or more screw jacks, the three or more screw jacks vertically translate relative to the chassis to vertically translate the platform.

In an embodiment the screw jacks are mechanically coupled to each other such that the vertical translation of each of the screw jacks are synchronised.

In an embodiment the screw jacks are mechanically coupled by at least one coupling member.

In an embodiment the lifting mechanism comprises a lifting motor, the lifting motor arranged in communication with the screw jacks, the lifting motor actuating the screw jacks such that the screw jacks translate vertically.

In an embodiment the lifting mechanism comprises a belt or chain drive assembly that couples the lifting motor to at least two screw jacks, the belt or chain drive assembly synchronising translation of the screw jacks.

In an embodiment the coupling member is connected to the lifting motor, the coupling member functioning as a drive shaft to transmit a lifting force from the lifting motor to the screw jacks connected to the coupling member.

In an embodiment the rotation mechanism is counter synchronized with the turning motor such that platform rotates in an opposite direction to the AGV such that platform isolates rotational forces on a load supported by the platform.

In an embodiment the rotation mechanism comprises a rotation motor, the rotation motor coupled to the platform by a rotation gear assembly, the rotation motor configured to actuate the rotation gear assembly to rotate the platform.

In an embodiment the rotation motor is counter synchronized with the turning motor to rotate the platform in a direction that is counter to the turning of the AGV.

In an embodiment the rotation motor is electrically connected to a switching circuit, the switching circuit is in electrical communication with a motor controller that controls the turning motor, and wherein the switching circuit is configured to switch the polarity of voltage or direction of current from the motor controller such that the rotation motor receives a voltage or current in a direction that is opposite to the voltage or current generated by the motor controller to rotate the platform in a direction that is opposite to a turning direction of the AGV.

In an embodiment the rotation gear assembly comprises a first gear and a second gear that are meshed together, the first gear and second gear positioned on the platform, the first gear in mechanical communication with the rotation motor and the second gear coupled to the first gear.

In an embodiment the first gear is smaller in diameter than the second gear and wherein a ratio of the diameters of the first gear to the second gear is such that driving the first gear creates an increase in torque on the second gear.

In an embodiment the second gear is integral to the platform such that driving the first gear causes the second gear to rotate thereby rotating the platform.

In an embodiment the platform comprises a raised lip extending outwardly from a load supporting face of the platform, the raised lip including a plurality of integral teeth formed within the lip and extending around the circumference of the lip such that the second gear is defined by the teeth formed within the lip.

In an embodiment the teeth are formed on an inner surface of the lip.

In accordance with a second aspect the present invention relates to a load supporting apparatus for an automated guided vehicle (AGV), the load supporting apparatus disposed on a chassis of the AGV, the load supporting apparatus comprising:

a platform to support a load, a lifting mechanism comprising one or more jacks, the platform coupled to the one or more jacks, the one or more jacks configured to raise or lower the platform, a rotation mechanism coupled to the platform, the rotation mechanism configured to rotate the platform, wherein the rotation mechanism is configured to rotate the platform in response to the AGV turning.

In an embodiment the platform comprises an arcuate periphery.

In an embodiment the platform is a circular shape or an oval shape.

In an embodiment the load supporting apparatus comprises three or more mounting struts, the mounting struts configured to mount the load supporting apparatus on the chassis.

In an embodiment the lifting mechanism comprises three or more screw jacks, the three or more screw jacks vertically translate relative to the chassis to vertically translate the platform, and the screw jacks being mechanically coupled to each other by at least one coupling member such that the vertical translation of each of the screw jacks are synchronised.

In an embodiment the lifting mechanism comprises a lifting motor, the lifting motor arranged in communication with the screw jacks, the lifting motor actuating the screw jacks such that the screw jacks translate vertically.

In an embodiment the lifting mechanism comprises a belt or chain drive assembly that couples the lifting motor to at least two screw jacks, the belt or chain drive assembly synchronising translation of the screw jacks, the coupling member is connected to the lifting motor; and wherein the coupling member functions as a drive shaft to transmit a lifting force from the lifting motor to the screw jacks connected to the coupling member.

In an embodiment the rotation mechanism is counter synchronized with the turning motor such that platform rotates in an opposite direction to the AGV such that platform isolates rotational forces on a load supported by the platform.

In an embodiment the rotation mechanism comprises a rotation motor, the rotation motor coupled to the platform by a rotation gear assembly, the rotation motor configured to actuate the rotation gear assembly to rotate the platform and wherein the rotation motor is counter synchronized with a turning motor of the AGV to rotate the platform in a direction that is counter to the turning of the AGV.

In an embodiment the rotation motor is electrically connected to a switching circuit, the switching circuit is in electrical communication with a motor controller that controls a drive motor or a turning motor of the AGV;

and wherein the switching circuit is configured to switch the polarity of voltage or direction of current from the motor controller such that the rotation motor receives a voltage or current in a direction that is opposite to the voltage or current generated by the motor controller to rotate the platform in a direction that is opposite to a turning direction of the AGV.

In an embodiment the rotation gear assembly comprises a first gear and a second gear that are meshed together, the first gear and second gear positioned on the platform, the first gear in mechanical communication with the rotation motor and the second gear coupled to the first gear.

In an embodiment the first gear is smaller in diameter than the second gear and wherein a ratio of the diameters of the first gear to the second gear is such that driving the first gear creates an increase in torque on the second gear.

In an embodiment the second gear is integral to the platform such that driving the first gear causes the second gear to rotate thereby rotating the platform.

In an embodiment the platform comprises a raised lip extending outwardly from a load supporting face of the platform, the raised lip including a plurality of integral teeth formed within the lip and extending around the circumference of the lip such that the second gear is defined by the teeth formed within the lip.

In an embodiment the teeth are formed on an inner surface of the lip.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

The term AGV as used herein means an automated guided vehicle that can automatically move around an environment.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, circuits, etc., may be shown in block diagrams in order not to obscure the embodiments in unnecessary detail. In other instances, well-known modules, structures and techniques may not be shown in detail in order not to obscure the embodiments.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, system, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which.

DETAILED DESCRIPTION OF A PREFERRED EMBODIMENT

Automated guided vehicles (AGVs) are becoming more commonplace across several industries for various applications. Automated guided vehicles (AGVs) are often used for materials handling tasks within factories or warehouses or other environments. Some example uses of AGVs are for moving shelving racks or moving goods or moving boxes/containers around a warehouse or factory. AGVs generally include a lifting apparatus such as a platform or a lifting arm or tines such as a forklift. Loads (e.g. boxes, shelving racks etc.) are supported by the lifting apparatus.

Often multiple AGVs are used in an indoor environment e.g. in a warehouse. Due to space constraints in an indoor environment there is always a risk of collisions between AGVs in an indoor environment and/or collisions between the AGVs and other objects within an indoor environment. AGVs can utilise any known guidance protocol (i.e. guidance methodology). For example, the environment may include waypoints or markers positioned along the floor of the environment or the AGV may include a stored map that is used by the AGV to navigate itself around an environment (e.g. a warehouse or factory).

Most autonomous guided vehicles (AGVs) available today are usually equipped with a suspension system to adapt to uneven surfaces as the AGV moves around an environment. One example use for AGVs is materials handling e.g. lifting and transporting various objects such as for example shelves or pallets or boxes or other items. The objects are normally supported on a support structure. However, the supported objects can become unstable and move around due to the movement of the AGV, especially when the AGV turns. In some instances, the objects can fall off the support structure which can damage the object and/or also cause disruption to the AGV operation.

The present disclosure relates to an AGV with a load supporting apparatus to support an object in a stable manner. The load supporting apparatus is configured to improve stability of a supported load as the AGV moves, in particular as the AGV turns.

In an embodiment the AGV comprises to an automated guided vehicle comprising: a chassis; a load supporting apparatus disposed on the chassis. The load supporting apparatus comprising; a platform to support a load, a lifting mechanism comprising one or more jacks, the platform coupled to the one or more jacks, the one or more jacks configured to raise or lower the platform, a rotation mechanism coupled to the platform, the rotation mechanism configured to rotate the platform, wherein the rotation mechanism is configured to rotate the platform in response to the AGV turning. The rotation mechanism is counter synchronized to a drive motor or turning motor of the AGV. The platform may be a multi sided polygon or may be circular platform.

In this embodiment the lifting mechanism comprises four jacks that function as lifting structures to raise or lower the platform. The lifting mechanism may comprise three or more jacks. The four jacks may be screw jacks or alternatively the jacks may be hydraulic or pneumatic jacks. The jacks are synchronized such that all four jacks are raised or lowered together. The lifting mechanism comprises a lifting motor that is coupled to the jacks to raise or lower the jacks, or control a further lifting actuator that is configured to simultaneously raise or lower the jacks. The rotation mechanism comprises a gearing arrangement comprising one or more gears that are coupled to the platform. The rotation mechanism further comprises a rotation motor that is coupled to the gear arrangement in order to rotate the platform by actuating the gear arrangement. The platform is formed to include teeth such that the platform forms a cog in the gear arrangement. The gear arrangement also includes a drive cog that is engaged to the platform to rotate the platform. The drive cog is arranged in communication with the rotation motor such that the rotation motor drives the drive cog to rotate the platform. The rotation motor is counter synchronized with the turning motor such that the platform rotates in an opposite direction to the AGV turning.

Figure 1:
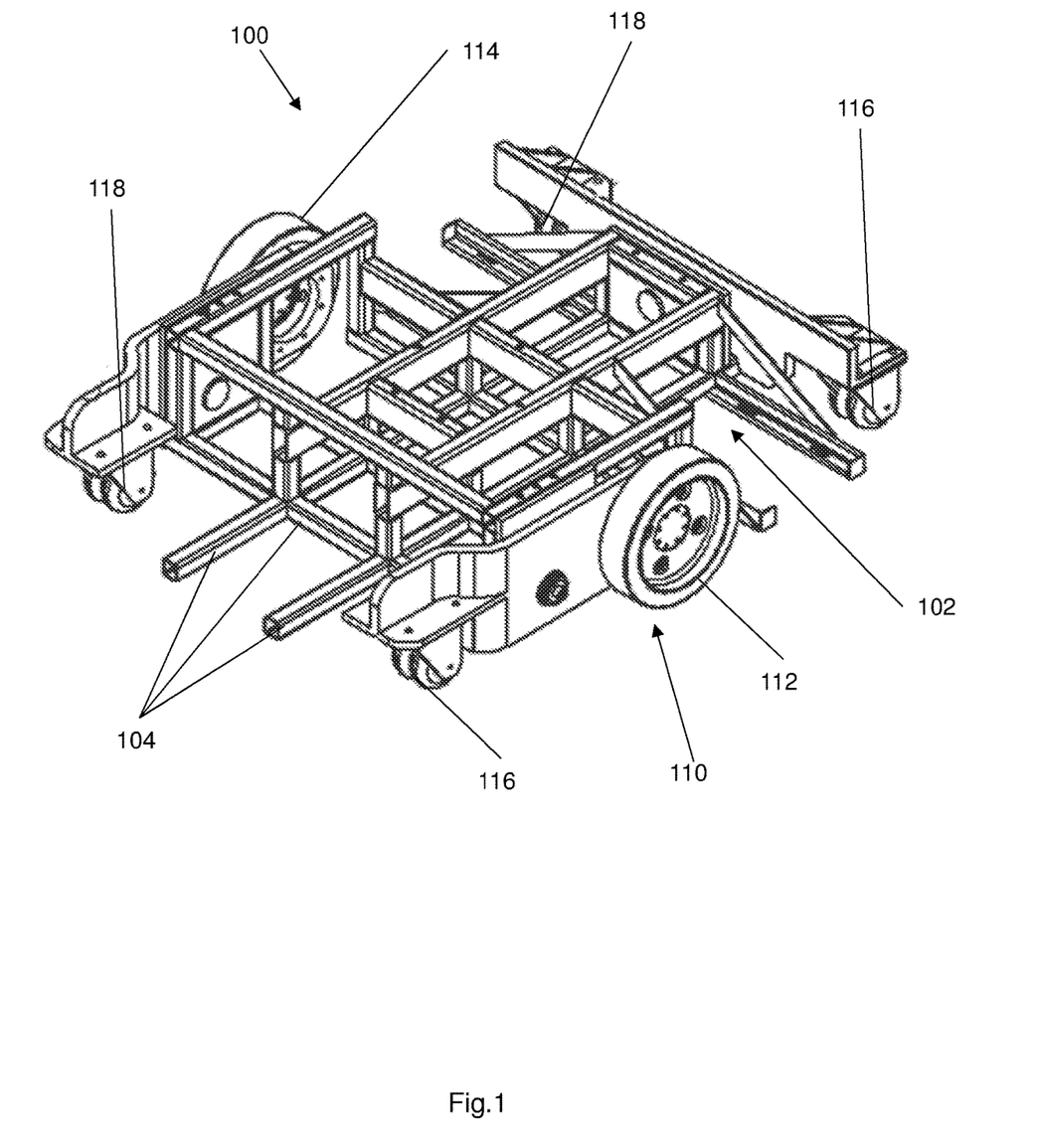
FIG. 1 shows an isometric view of an example embodiment of an automated guided vehicle (AGV) that includes a load supporting apparatus.

A further embodiment is disclosed with reference to illustrated figures. FIG. 1 shows an example an automated guided vehicle (AGV) 100. The AGV 100 comprises a chassis 102.

The chassis 102 comprises a polygon shape such as for example a rectangle shape or a square shape. The chassis comprises a plurality of elongate members 104 that are interconnected to form the chassis 102. The elongate members are interconnected to define a skeleton that makes up the chassis 102. The chassis 102 includes a plurality of gaps to reduce the mass of the chassis 102.

The elongate members 104 are rigid members formed from a rigid material. In one example the members 104 are formed from a metal e.g. aluminium or stainless steel. The frame members 104 are rigid and robust such that the chassis can support other components of the AGV 100. The elongate frame members 104 are coupled together by fasteners such as for example bolts or screws or pins or rivets or any other suitable fasteners.

The AGV 100 comprises a drive assembly 110 disposed on the chassis 102. The drive assembly 110 is configured to generate a propulsion force to drive the AGV. In one configuration the drive assembly 110 comprises a drive motor configured to generate a propulsion force to propel the AGV and the drive assembly further comprises a turning motor configured generate a turning force to turn the AGV. The AGV 100 comprises two drive wheels 112, 114 and two turning wheels 116, 118. The turning wheels 116, 118 are freely rotatable. The turning wheels 116, 118 are mounted on the chassis via a caster or bearings that allow free rotation of the turning wheels. The drive wheels 112, 114 are mounted on the chassis 102 and coupled to the drive assembly 110. The drive wheels 112, 114 are coupled to the drive motor 122 and the turning motor 124. In this configuration the drive wheels 112, 114 are propelled in a single direction by the drive motor. The AGV 100 is turned by the turning motor 124 actuating the drive wheels 112, 114. One drive wheel 112 is actuated in one direction and the second drive wheel is actuated in the opposite direction to turn the AGV 100.

The turning radius of the AGV 100 is small due to the opposing direction movement of the drive wheels 112, 114.

Figure 2:
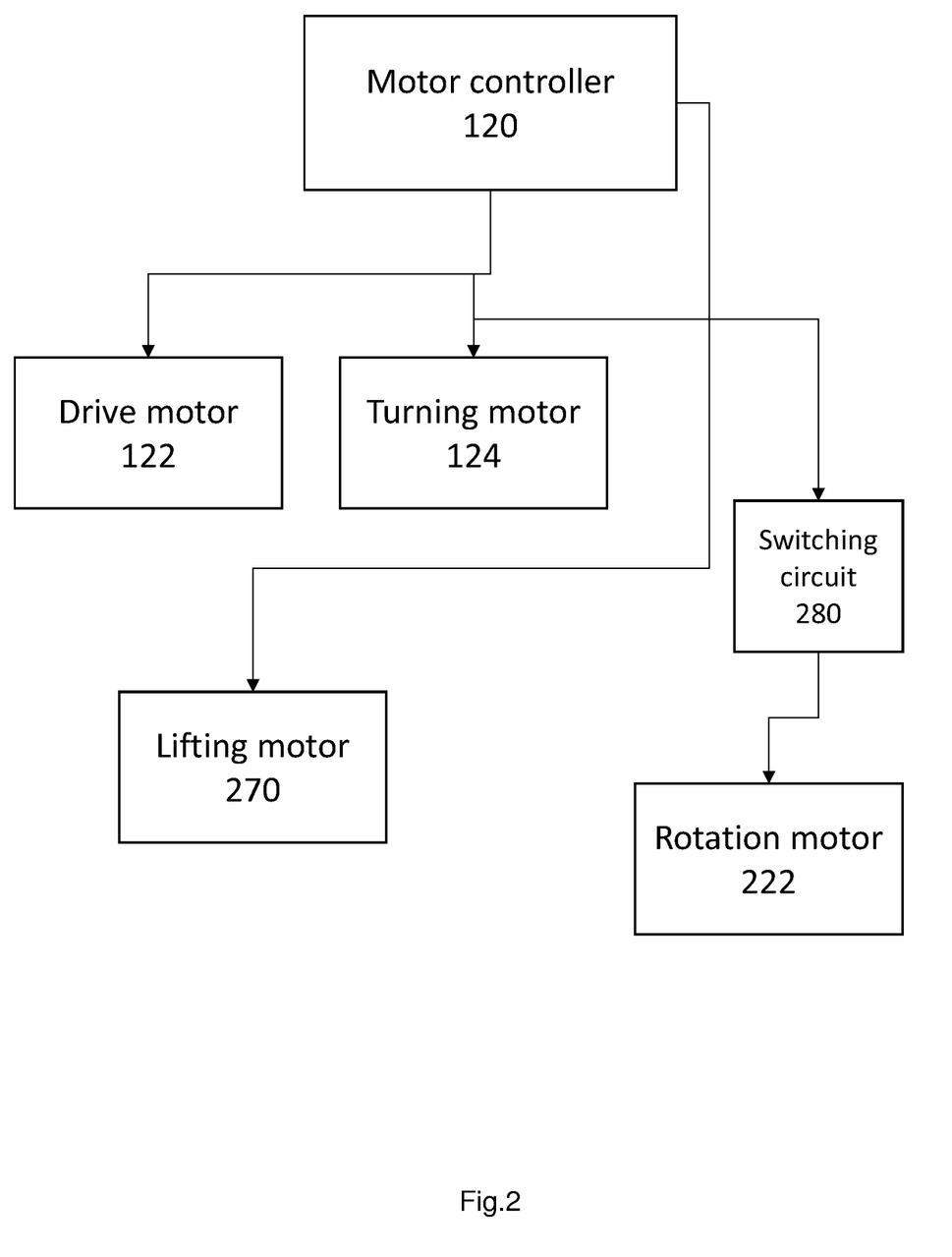
FIG. 2 shows a schematic arrangement the electronic connection arrangement between the drive motor, turning motor, lifting motor and a motor controller.

The AGV 100 comprises a motor controller 120. The motor controller 120 is arranged in electronic communication with the drive motor 122 and the turning motor 124. The motor controller 120 is configured to send electronic signals to control operation of the drive motor 122 and the turning motor 124. FIG. 2 shows a schematic diagram illustrating the electronic connection arrangement between the drive motor 122, turning motor 124 and the motor controller 120. The electrical connections between the motor controller 120 and the drive motor 122 and turning motor 124 may be wired or wireless connections.

In an alternative configuration the AGV 100 may comprise a single motor that functions as a drive motor and a rotation motor. In this alternative configuration the AGV may include a drive shaft and a steering shaft that is coupled to the motor. The motor exerts a force that is transmitted to the drive wheels by the drive shaft and a turning force is transmitted to the drive wheels by the steering shaft to turn the AGV.

Figure 3:
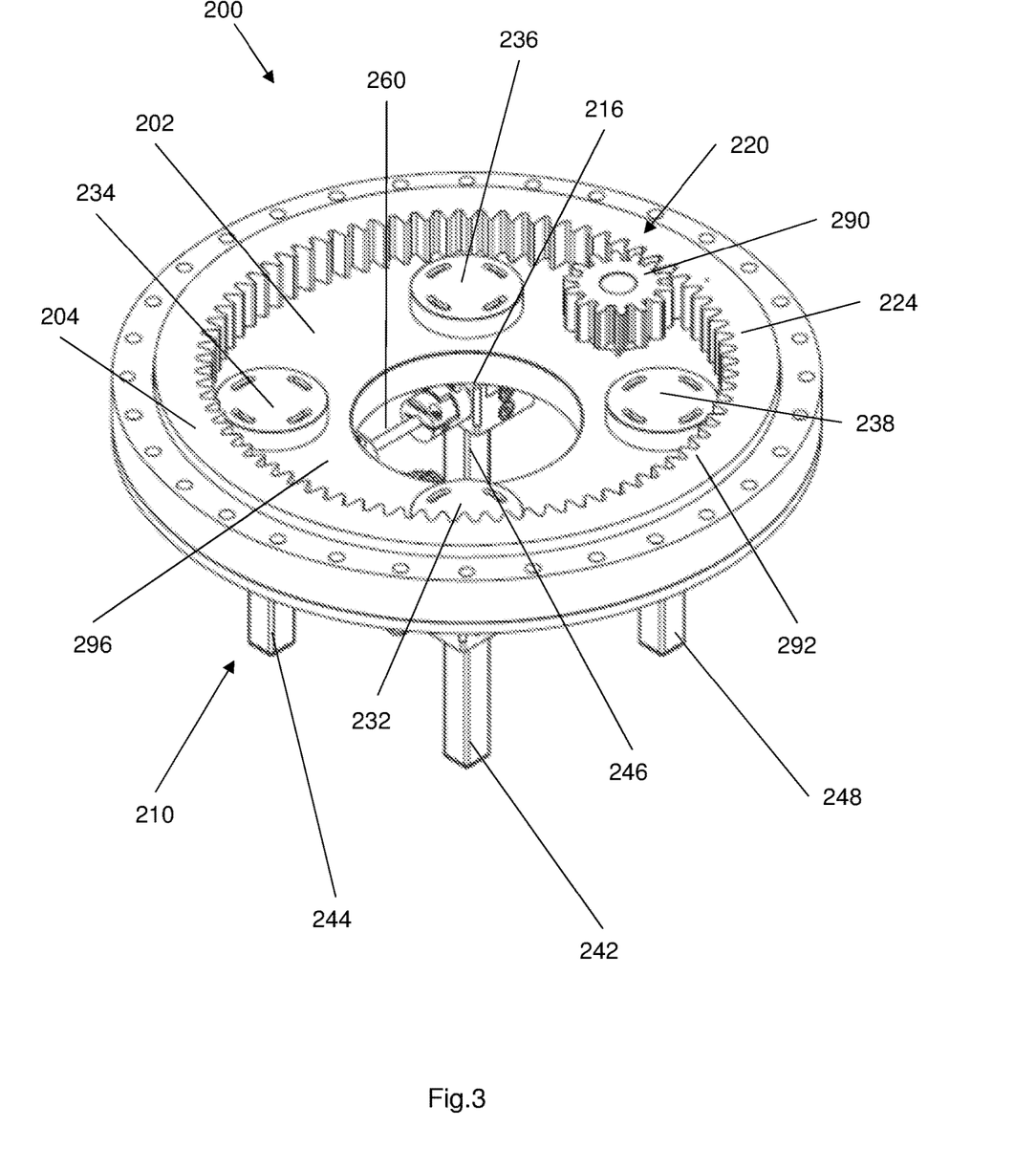
FIG. 3 shows an isometric view of the load supporting apparatus.
Figure 4:
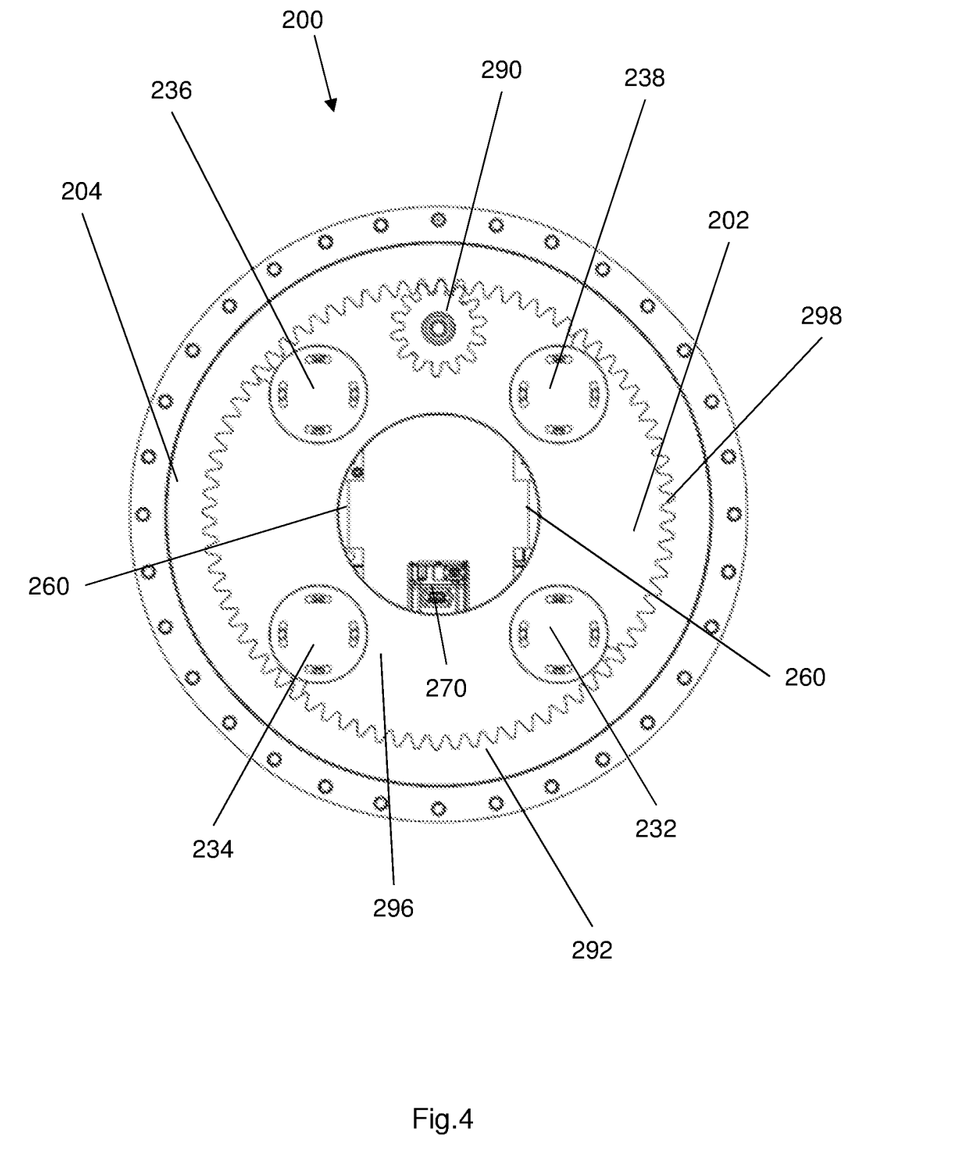
FIG. 4 shows a plan view i.e. a top view of the load supporting apparatus.
Figure 5:
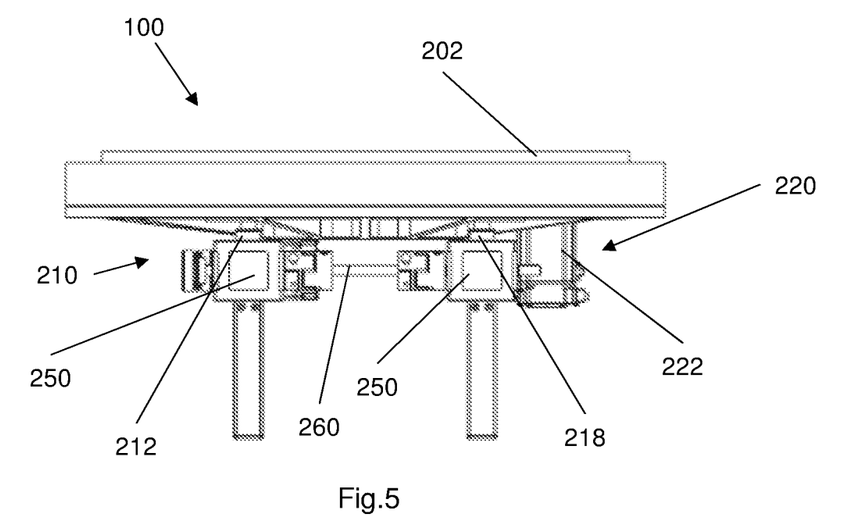
FIG. 5 shows a side of the load supporting apparatus.
Figure 6:
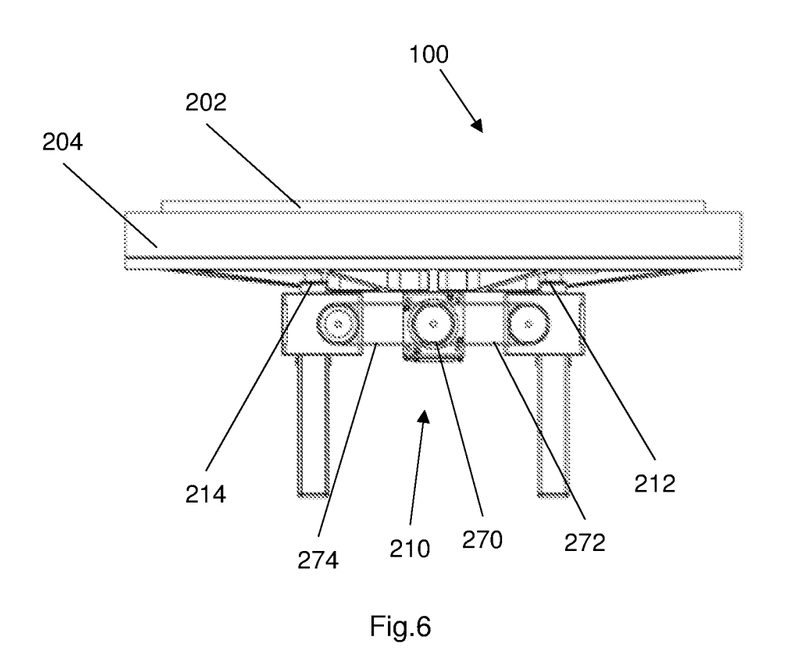
FIG. 6 shows an end view of the load supporting apparatus.

The AGV comprises a load supporting apparatus 200. FIGS. 3 to 6 show various views of the load supporting apparatus 200. Details of the load supporting apparatus will be described with reference to FIGS. 3 to 6. FIG. 3 shows an isometric view of the load supporting apparatus. FIG. 4 shows a plan view i.e. a top view of the load supporting apparatus. FIG. 5 shows a side of the load supporting apparatus and FIG. 6 shows an end view of the load supporting apparatus.

The load supporting apparatus 200 is disposed on the chassis 102. The load supporting apparatus 200 is removably coupled to the chassis 102. The load supporting apparatus 200 is configured to holds a load, in particular an object. The object may be for example a shelf or pallet or boxes or any other objects. The load supporting apparatus 200 comprises a platform 202 to support a load, a lifting mechanism 210 and a rotation mechanism 220. The lifting mechanism is coupled to the platform and configured to raise or lower the platform. The rotation mechanism 220 is also coupled to the platform and configured to rotate the platform 202.

The platform 202 in the illustrated embodiment comprises an arcuate periphery. The platform 202 comprises a circular shape when viewed in plan. The platform 202 also comprises a raised wall 204 that extends around the platform and defines a periphery of the platform 202. The platform 202 may alternatively be an elliptical or oval shape.

The lifting mechanism 210 comprises four lifting structures. As shown in FIGS. 3 to 6, the lifting mechanism 210 comprises a plurality of jacks. In one example the lifting mechanism comprises at least one jack but preferably includes a plurality of jacks. In one example configuration the lifting mechanism comprises at least three jacks in order to evenly distribute the weight of the platform.

In the illustrated embodiment the lifting mechanism comprises four jacks 212, 214, 216 and 218. The platform 202 is coupled to the four jacks 212-218. The four jacks 212-218 carry the platform 202. The jacks 212-218 are connected to the platform 202 by connecting flanges 232, 234, 236 and 238. A single flange is associated with a single jack. The connecting flanges are connected to the platform and the jacks. As shown, the rotational gear 292 may be comprised of a bearing with an inner gear. The inner gear will rotate with the gear 290. The bearing will bolt to 202 and rotate with the chassis.

Each jack 212-218 comprises a screw jack. The screw jack includes a horizontal drive screw that is engaged with a vertical screw. The horizontal drive screw is rotated around a horizontal screw, which causes the vertical screw to move along a vertical axis i.e. move vertically. Each screw jack 212-218 is configured to translate vertically in order to raise or lower the platform.

The load supporting apparatus 200 comprises four struts 242, 244, 246 and 248. Each screw jack 212-218 is associated with a single strut 242-246. Each screw jack 212-218 is configured to linearly translate co-axial to a vertical axis of the associated strut. The screw jacks 212-218 are positioned such that the drive screw is retained within strut 242-246. A housing 250 may support the weight of the loading supporting apparatus and any additional loads The screw jacks 212-218 are synchronized with each other such that the screw jacks translate linearly together. The vertical translation of the jacks 212-218 causes the platform 202. The jacks 212-218 are mechanically coupled to each other by at least one coupling member. As shown in FIGS. 3 and 4 two jacks are coupled together by a coupling rod 260. The lifting mechanism comprises pairs of mechanically coupled jacks. As shown in FIGS. 3 and 4 jacks 212, 214 are coupled together by rod 260 and jacks 216 and 218 are coupled together by rod 260. The apparatus 200 includes two coupling rods labelled 260. The coupling rods 260 are rotatable and function to synchronize raising and lowering of the jacks within the pairs.

The lifting mechanism 210 further comprises a lifting motor 270 and a pair of belt drives 272, 274. The belt drives 272, 274 couple two jacks (one from each coupled jack pair) to the lifting motor 270 such that the lifting motor 270 can actuate the jacks to raise and/or lower the jacks. As shown in FIG. 3 the lifting motor 270 is connected to a pair of laterally extending belt drives 272, 274. The belt drives 272, 274 extend in opposite directions to each other. The belt drives connect to jacks 212 and 216 raise and lower the jacks. The lifting motor and the belt drives actuate a driving screw. The belt drives also actuate the rear jacks 216, 218 by rotating the coupling rods 260 that are connected to the lifting motor. The coupling rods 260 can function as drive shafts that transmit a lifting force from the lifting motor 270 to the screw jacks 216, 218 connected to the coupling rods 260. The four jacks 212-218 are raised and lowered simultaneously i.e. in synchrony. The synchronized movement of the four jacks 212-218 causes the platform 202 to be raised in a substantially planar arrangement.

The rotation mechanism 220 comprises a rotation motor 222 and a rotation gear assembly 224. The rotation motor 222 is coupled to the platform 202 by the rotation gear assembly 224, and wherein the rotation motor 222 is configured to actuate the rotation gear assembly 224 to rotate the platform 202. The rotation motor 222 is counter synchronized with the turning motor to rotate the platform in a direction that is counter to the turning of the AGV 100.

The rotation motor 222 is electrically connected to a switching circuit 280. The switching circuit 280 is in electrical communication with the motor controller 120. FIG. 2 shows the switching circuit 280 arranged between the rotation motor 222 and the motor controller 120 and in electrical communication between the rotation motor 222 and the motor controller 120. The switching circuit receives the same input as the turning motor and switches this input prior to providing it to the rotation motor 222. The switching circuit 280 is configured to switch the polarity of voltage or direction of current from the motor controller 120 such that the rotation motor 222 receives a voltage or current in a direction that is opposite to the voltage or current generated by the motor controller to rotate the platform 202 in a direction opposite to the turning direction of the AGV 100. The switching circuit 280 comprises an electrical circuit that can switch the polarity of the voltage signal. In one example the switching circuit may comprise a bridge circuit comprising a plurality of diodes that switches the voltage of the actuation signal provided to the turning motor. The switching circuit reversing polarity causes the rotation motor to turn in the opposite direction to the turning motor.

Alternatively, the switching circuit may cause the output to the rotation motor be opposite to the turning motor output such that the rotation motor is turned in the opposite direction to the turning motor.

The motor controller 120 may also be connected to the lifting motor 270 and actuate the lifting motor. The motor controller 120 may include separate electronic modules that are configured to actuate the drive motor, lifting motor and turning motor individually. The rotation motor is counter synchronized to the turning motor and therefore is driven based on the signals of provided to the turning motor. The motor controller 120 may be a pulse width modulation (PWM) module.

The rotation gear assembly 224 comprises a first gear 290 (i.e. first cog) and a second gear 292 (i.e. a second cog) that are meshed together. The first gear 290 and the second gear 292 positioned on the platform 202. The first gear 290 is arranged in mechanical communication with the rotation motor 222. The second gear 292 is coupled to the first gear 290. The first gear 290 and a second gear 292 form a gear reduction. The first gear 290 is smaller in diameter than the second gear 292. The ratio of the diameters of the first and second gear is such that driving the first gear 290 creates an increase in torque on the second gear 292.

The second gear 292 is integral to the platform 202 such that driving the first gear 290 by the rotation motor 222 causes the second gear 292 to rotate thereby rotating the platform 202. The platform 202 includes a wall 204 extending outwardly from a load supporting face 296 of the platform 202. The raised wall 204 includes a plurality of integral teeth 298 formed integrally on the wall 204. The wall defines the periphery of the platform 200. The teeth extend around the entirety of the wall 204, such that the platform 202 forms the second gear 292 (i.e. second cog). The teeth 298 extend toward the centre of the platform 202. The teeth 298 are formed on an inner surface of the wall 204. The second gear 292 is defined by the teeth 298 formed on the wall 204. The platform 202, in particular the teeth 298 are meshed with the teeth of the first gear 290 to form a gear assembly of the rotation mechanism 220, as shown in FIG. 4.

The rotation motor 222 is vertically arranged and is directly connected to the first gear 290. The rotation motor 222 actuates the first gear 290 and causes the first gear 290 to rotate. As shown in FIG. 3 the first gear 290 has teeth that are engaged to the teeth of the second gear 292. Rotation of the first gear 290 causes rotation of the platform 290 (i.e. the second gear 292). The rotation motor 222 is counter synchronized to the AGV rotation i.e. turning. The motor controller transmits a signal to the turning motor 124 and the rotation motor 222. The signal provided to the rotation motor 222 is of an opposite polarity e.g. an opposite polarity voltage is provided to the rotation motor 222 such that the rotation motor 222 turns the platform in a direction opposite to the turning direction of the AGV 100.

The load supporting apparatus 200 is formed as an integral module. The rotation mechanism 220 is integrated into the lifting mechanism 210. The platform 202 is coupled to the jacks 212-218 and supported by the jacks. The jacks 212-218 and the platform are supported by the struts. The load supporting apparatus 200 is easy to install onto the chassis 102. The integrated load supporting apparatus 200 can be removably attached to the chassis 102 such that different load supporting modules or other modules can be interchangbly connected to the chassis.

The load supporting apparatus as described herein is advantageous because it provides an integrated apparatus that supports a load stably, in particular in response to the AGV turning. The load supporting apparatus allows a supported load e.g. an object to be raised or lowered and may also simultaneously allow rotation of the platform to counteract any centripetal forces due to the AGV turning. The interconnected and synchronized jacks allow the platform to be uniformly raised or lowered thereby providing a flat stable platform to support a load. The rotation mechanism is counter synchronized with the AGV turning motor so that the platform can be rotated in a direction opposite to the AGV turning direction to counter act any forces due to the AGV turning. The load supporting apparatus is advantageous because it supports a load in a stationary orientation even when the AGV is moving especially when the AGV is turning.

In one configuration the AGV may also comprise a suspension system that is configured to stabilize the chassis and the load supporting platform as the AGV travels over uneven surfaces and/or as the AGV experiences impulses. The suspension system comprises at least one longitudinal arm the is pivotably coupled to the chassis and a transverse arm that is pivotably coupled to the chassis. The longitudinal arm comprises a drive wheel and a steering wheel. The transverse arm comprises a pair of steering wheels. The transverse arm is perpendicular to the longitudinal arm. Each arm pivots relative to the chassis to absorb impulses or forces due to the AGV travelling over uneven surfaces. The longitudinal arm pivots about a first pivot axis and the transverse arm pivots about a second pivot axis, wherein the first pivot axis is perpendicular to the second pivot axis. Each arm is a unitary arm that pivots relative to the chassis. The longitudinal arm and the transverse arm decouples wheels from the chassis. The pivoting of the arms also helps to maintain the wheels in contact with the ground as the AGV moves across various surfaces. The suspension system decouples the load supporting apparatus such that impulses or forces experienced by the wheels of the AGV are not transferred to the load supporting apparatus, thereby further improving stability of any load or object being carried by the AGV.

In an alternative embodiment the AGV may comprise a plurality of motor controllers.

Each motor controller may be a separate electronic module e.g. a microcontroller or ASIC. Each motor controller may be a pulse width modulation module (PWM) that is configured to provide PWM power signals to actuate the various motors. In this alternative embodiment the AGV may comprise a drive motor controller, a lifting motor controller and a turning motor controller. The turning motor controller may supply actuation signals to the turning motor and the rotation motor. The rotation motor is counter synchronized to the turning motor. The turning motor controller may also comprise a switching circuit that is electrically coupled between the turning motor controller and the rotation motor. The switching circuit switches the actuation signal generated by the turning motor controller prior to the rotation motor receiving the signals, such that the rotation motor receives the opposite signal e.g. opposite polarity. This actuates the rotation motor in the opposite direction to the turning motor. The switching circuit may include a circuit implemented on a PCB or ASIC or may include a separate microcontroller. Alternatively, the AGV may comprise a rotation motor controller that is electrically coupled to the rotation motor and actuates the rotation motor such that the rotation motor turns the platform in an opposite direction to the turning of the AGV. In this alternative form the switching circuit may be located between a power source and the rotation motor controller.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. An automated guided vehicle (AGV) comprising:
   a chassis;
   a drive assembly disposed on the chassis, the drive assembly comprising a drive motor configured to generate a propulsion force to propel the AGV, and a turning motor configured to generate a turning force to turn the AGV;
   a load supporting apparatus disposed on the chassis, the load supporting apparatus comprising;
   a platform to support a load;
   a lifting mechanism comprising three or more screw lacks and a lifting motor, wherein the platform is coupled to the three or more screw lacks, wherein the lifting motor is arranged in communication with and to actuate the three or more screw jacks such that the three or more screw jacks vertically translate relative to the chassis to vertically translate the platform, thereby raising or lowering the platform; wherein the three or more screw jacks are mechanically coupled to each other such that the vertical translation of each of the three or more screw jacks are synchronized; and
   a rotation mechanism coupled to the platform, the rotation mechanism is configured to rotate the platform in response to the AGV turning, wherein the rotation mechanism comprises a rotation motor coupled to the platform by a rotation gear assembly, wherein the rotation motor is configured to actuate the rotation gear assembly to rotate the platform, and wherein the rotation motor is electrically connected to a switching circuit, the switching circuit is in electrical communication with a motor controller that controls the turning motor, and wherein the switching circuit is configured to switch the polarity of voltage or direction of current from the motor controller such that the rotation motor receives a voltage or current in a direction that is opposite to the voltage or current generated by the motor controller to rotate the platform in a direction that is opposite to a turning direction of the AGV, such that the platform isolates rotational forces on the load supported by the platform, thereby stabilizing the load onto the platform when the AGV turns.

2. An automated guided vehicle in accordance with claim 1, wherein the platform is plate having a multisided polygon shape.

3. An automated guided vehicle in accordance with claim 1, wherein the platform comprises an arcuate periphery.

4. An automated guided vehicle in accordance with claim 3, wherein the platform is a circular shape.

5. An automated guided vehicle in accordance with claim 1, wherein the load supporting apparatus comprises three or more mounting struts, the mounting struts configured to mount the load supporting apparatus on the chassis.

6. An automated guided vehicle in accordance with claim 1, wherein the three or more screw jacks are mechanically coupled by at least one coupling member.

7. An automated guided vehicle in accordance with claim 6, wherein the coupling member is connected to the lifting motor, the coupling member functioning as a drive shaft to transmit a lifting force from the lifting motor to the screw jacks connected to the coupling member.

8. An automated guided vehicle in accordance with claim 1, wherein the lifting mechanism comprises a belt or chain drive assembly that couples the lifting motor to at least two of the three or more screw jacks, the belt or chain drive assembly synchronising translation of the screw jacks.

9. An automated guided vehicle in accordance with claim 1, wherein the rotation motor is counter synchronized with the turning motor to rotate the platform in a direction that is counter to the AGV turning.

10. An automated guided vehicle in accordance with claim 1, wherein the rotation gear assembly comprises a first gear and a second gear that are meshed together, the first gear and the second gear positioned on the platform, the first gear in mechanical communication with the rotation motor and the second gear coupled to the first gear.

11. An automated guided vehicle in accordance with claim 10, wherein the first gear is smaller in diameter than the second gear and wherein a ratio of the diameters of the first gear to the second gear is such that driving the first gear creates an increase in torque on the second gear.

12. An automated guided vehicle in accordance with claim 10, wherein the second gear is integral to the platform such that driving the first gear causes the second gear to rotate thereby rotating the platform.

13. An automated guided vehicle in accordance with claim 1, wherein the platform comprises a raised lip extending outwardly from a load supporting face of the platform, the raised lip including a plurality of integral teeth formed within the lip and extending around the circumference of the lip such that the second gear is defined by the teeth formed within the lip.

14. An automated guided vehicle in accordance with claim 13, wherein the teeth are formed on an inner surface of the lip.

15. A load supporting apparatus for an automated guided vehicle (AGV), the AGV including a chassis and a drive assembly disposed on the chassis, wherein the drive assembly comprises a drive motor configured to generate a propulsion force to propel the AGV and the drive assembly further comprises a turning motor configured to generate a turning force to turn the AGV, the load supporting apparatus, in use, being adapted to be disposed on the chassis, and the load supporting apparatus comprising:
   a platform to support a load,
   a lifting mechanism comprising three or more screw lacks and a lifting motor, the platform is coupled to the three or more screw lacks, wherein the lifting motor is arranged in communication with and to actuate the three or more screw jacks such that the three or more screw jacks, vertically translate relative to the chassis to vertically translate the platform, and the three or more screw jacks are mechanically coupled to each other such that the vertical translation of each of the three or more screw jacks is synchronized; and a rotation mechanism coupled to the platform, the rotation mechanism configured to rotate the platform in response to the AGV turning, wherein the rotation mechanism comprises a rotation motor coupled to the platform by a rotation gear assembly, the rotation motor is configured to actuate the rotation gear assembly to rotate the platform; and wherein the rotation motor is electrically connected to a switching circuit, the switching circuit is in electrical communication with a motor controller that controls the turning motor, and wherein the switching circuit is configured to switch the polarity of voltage or direction of current from the motor controller such that the rotation motor receives a voltage or current in a direction that is opposite to the voltage or current generated by the motor controller to rotate the platform in a direction that is opposite to a turning direction of the AGV, such that the platform isolates rotational forces on the load supported by the platform, thereby stabilizing the load onto the platform when the AGV turns.

16. A load supporting apparatus in accordance with claim 15, wherein the platform comprises an arcuate periphery.

17. A load supporting apparatus in accordance with claim 16, wherein the platform is a circular shape or an oval shape.

18. A load supporting apparatus in accordance with claim 15, wherein the load supporting apparatus comprises three or more mounting struts, the mounting struts configured to mount the load supporting apparatus on the chassis.

19. A load supporting apparatus in accordance with claim 15, wherein the lifting mechanism comprises a belt or chain drive assembly that couples the lifting motor to at least two of the three or more screw jacks, the belt or chain drive assembly synchronising translation of the screw jacks, the three or more screw jacks are mechanically coupled by at least one coupling member and the coupling member is connected to the lifting motor; and wherein the coupling member functions as a drive shaft to transmit a lifting force from the lifting motor to the screw jacks connected to the coupling member.

20. A load supporting apparatus in accordance with claim 15, wherein the rotation motor is counter synchronized with a turning motor of the AGV to rotate the platform in a direction that is counter to the turning of the AGV.

21. A load supporting apparatus in accordance with claim 15, wherein the rotation gear assembly comprises a first gear and a second gear that are meshed together, the first gear and second gear positioned on the platform, the first gear in mechanical communication with the rotation motor and the second gear coupled to the first gear.

22. A load supporting apparatus in accordance with claim 21, wherein the first gear is smaller in diameter than the second gear and wherein a ratio of the diameters of the first gear to the second gear is such that driving the first gear creates an increase in torque on the second gear.

23. A load supporting apparatus in accordance with claim 21, wherein the second gear is integral to the platform such that driving the first gear causes the second gear to rotate thereby rotating the platform.

24. A load supporting apparatus in accordance with claim 21, wherein the platform comprises a raised lip extending outwardly from a load supporting face of the platform, the raised lip including a plurality of integral teeth formed within the lip and extending around the circumference of the lip such that the second gear is defined by the teeth formed within the lip.

25. A load supporting apparatus in accordance with claim 24, wherein the teeth are formed on an inner surface of the lip.

* * * * *

UNITED STATES PATENT AND TRADEMARK OFFICE
CERTIFICATE OF CORRECTION

PATENT NO. : 11,059,707 B2
APPLICATION NO. : 16/229019
DATED : July 13, 2021
INVENTOR(S) : Wing Leung Chow et al.

Page 1 of 1

It is certified that error appears in the above-identified patent and that said Letters Patent is hereby corrected as shown below:

In the Claims

Claim 1, Column 11, Lines 34-36 is amended to read: "a lifting mechanism comprising three or more screw jacks and a lifting motor, wherein the platform is coupled to the three or more screw jacks, wherein the lifting motor"

Claim 15, Column 12, Lines 61-63 is amended to read: "a lifting mechanism comprising three or more screw jacks and a lifting motor, the platform is coupled to the three or more screw jacks, wherein the lifting motor is"

Claim 24, Column 14, Line 27 is amended to read: "15, wherein the platform comprises a raised lip extending"

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*